(12) United States Patent
Tochigi et al.

(10) Patent No.: US 12,545,450 B2
(45) Date of Patent: Feb. 10, 2026

(54) PRODUCTION LINE MANAGEMENT SYSTEM, PRODUCTION LINE MANAGEMENT METHOD, CAN MANAGEMENT SYSTEM, CAN, MANUFACTURING METHOD FOR CAN

(71) Applicant: TOYO SEIKAN CO., LTD., Tokyo (JP)

(72) Inventors: Takayuki Tochigi, Yokohama (JP); Kazuhiko Nakayama, Yokohama (JP); Shinobu Miura, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 586 days.

(21) Appl. No.: 18/050,579

(22) Filed: Oct. 28, 2022

(65) Prior Publication Data

US 2023/0081638 A1    Mar. 16, 2023

Related U.S. Application Data

(63) Continuation of application No. PCT/JP2021/016124, filed on Apr. 21, 2021.

(30) Foreign Application Priority Data

Apr. 30, 2020  (JP) ................................ 2020-080739
Jan. 6, 2021   (JP) ................................ 2021-001023

(51) Int. Cl.
*G05B 19/418* (2006.01)
*B65B 3/04* (2006.01)
(Continued)

(52) U.S. Cl.
CPC ................ *B65B 3/04* (2013.01); *B65B 57/02* (2013.01); *B65C 3/08* (2013.01); *G05B 19/41875* (2013.01)

(58) Field of Classification Search
CPC .. B65B 3/04; B65B 57/02; B65B 3/30; B65B 55/12; B65B 57/00; B65C 3/08;
(Continued)

(56) References Cited

U.S. PATENT DOCUMENTS

| 2003/0176942 | A1* | 9/2003 | Sleep | G06V 20/66 700/213 |
|---|---|---|---|---|
| 2009/0009601 | A1 | 1/2009 | Li | |
| 2020/0219112 | A1* | 7/2020 | Nakayama | B65G 61/00 |

FOREIGN PATENT DOCUMENTS

| CN | 1889098 A | 1/2007 |
|---|---|---|
| CN | 105825266 A | 8/2016 |

(Continued)

OTHER PUBLICATIONS

International Search Report dated Jul. 13, 2021 in Application No. PCT/JP2021/016124.

(Continued)

*Primary Examiner* — Yuhui R Pan
(74) *Attorney, Agent, or Firm* — Sughrue Mion, PLLC

(57) ABSTRACT

Provided is a production line management system for managing a manufacturing line for containers. The production line management system includes a first reading unit for reading an identification code applied to each of the containers when the container with the identification code indicating an identifier being information identifying the container passes through a first point on the manufacturing line, a second reading unit for reading the identification code applied to each of the containers after the first reading unit reads the identification code, and a computing unit for generating a database in which the identifier indicated by the identification code and relevant information about each of the containers are associated, and determining normality/abnormality of each of the containers by comparing the relevant information associated in the database with the (Continued)

identifier indicated by the identification code read in the second reading unit with predetermined setting information.

9 Claims, 7 Drawing Sheets

(51) Int. Cl.
    *B65B 57/02* (2006.01)
    *B65C 3/08* (2006.01)
(58) Field of Classification Search
    CPC .... G05B 19/41875; G05B 2219/31312; G05B 2219/32196; G05B 19/4183; B67C 2003/2657; B67C 3/00; B21D 51/26; B65D 1/40; B65D 1/165; B65D 2203/06; G06Q 10/0639; G06Q 10/08; G06Q 50/04; Y02P 90/02; Y02P 90/30
    See application file for complete search history.

(56) References Cited

FOREIGN PATENT DOCUMENTS

| CN | 111061238 A | * | 4/2020 | ....... G05B 19/41875 |
| JP | 9-226776 A | | 9/1997 | |
| JP | H09226776 A | * | 9/1997 | |
| JP | 2009-93558 A | | 4/2009 | |
| JP | 2017-200752 A | | 11/2017 | |
| JP | 2018-2249 A | | 1/2018 | |
| JP | 2019-49769 A | | 3/2019 | |
| WO | WO-2019049454 A1 | * | 3/2019 | ............... B65B 5/02 |

OTHER PUBLICATIONS

Written Opinion of the International Searching Authority dated Jul. 13, 2021 in Application No. PCT/JP2021/016124.
International Preliminary Report on Patentability dated Oct. 27, 2022 with a Translation of the Written Opinion of the International Searching Authority in Application No. PCT/JP2021/016124.
Translation of Office Action dated Nov. 9, 2021 from the Japanese Patent Office in corresponding Application No. 2021-001023.
Communication dated Jul. 17, 2024 from the State Intellectual Property Office of P.R. of China in Application No. 202180029007.4.
Partial Supplementary European Search Report issued Apr. 29, 2024 in European Application No. 21795713.3.

* cited by examiner

FIG. 7A  Process history table 555a

Manufacturing date: 2020/08/01

| Code printing time | Individual identifier | Printer step plate number | Necking step lane number | Inspection result | Inspection time |
|---|---|---|---|---|---|
| ⋮ | ⋮ | ⋮ | ⋮ | ⋮ | ⋮ |
| 12:00:01 | C0001 | P1 | N1 | Good | 15:00:01 |
| 12:00:02 | C0002 | P2 | N3 | Good | 15:00:02 |
| 12:00:03 | C0003 | P3 | N2 | Good | 15:00:03 |
| 12:00:04 | C0004 | P4 | N4 | Good | 15:00:04 |
| 12:00:05 | C0005 | P5 | N5 | Bad | 15:00:05 |
| 12:00:06 | C0006 | P1 | N1 | Good | 15:00:06 |
| 12:00:07 | C0007 | P2 | N2 | Good | 15:00:07 |
| 12:00:08 | C0008 | P3 | N4 | Good | 15:00:08 |
| 12:00:09 | C0009 | P4 | N5 | Good | 15:00:09 |
| 12:00:10 | C0010 | P5 | N3 | Bad | 15:00:10 |
| ⋮ | ⋮ | ⋮ | ⋮ | ⋮ | ⋮ |

FIG. 7B  Printer step histogram H525

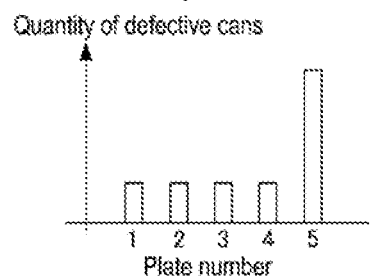

FIG. 7C  Necking step histogram H526

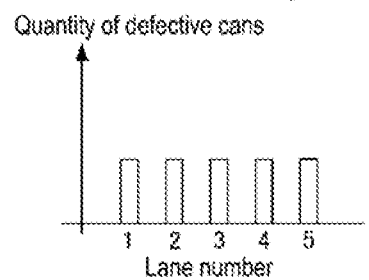

FIG. 7D  Inquiry terminal 560

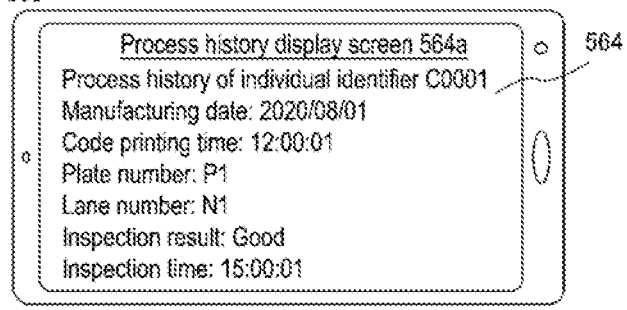

PRODUCTION LINE MANAGEMENT SYSTEM, PRODUCTION LINE MANAGEMENT METHOD, CAN MANAGEMENT SYSTEM, CAN, MANUFACTURING METHOD FOR CAN

CROSS REFERENCE TO RELATED APPLICATIONS

This application is a Rule 53(b) Continuation of International Application No. PCT/JP2021/016124 filed Apr. 21, 2021, claiming priority based on Japanese Patent Application No. 2020-080739 filed Apr. 30, 2020 and Japanese Patent Application No. 2021-001023 filed Jan. 6, 2021. The contents of all of the above-noted prior applications are incorporated herein by reference in their entirety.

TECHNICAL FIELD

The disclosure relates to a production line management system and method, and more specifically to a production line management system and method of identifying individual containers and managing a manufacturing line for containers and/or a filling line for containers.

BACKGROUND

An example of a conventional production line management system is described in JP 2019-49769 A. According to JP 2019-49769 A, containers such as cans for packaging are individually managed, regardless of the order in which the containers are transported, by giving each of the containers an identification code indicating an identifier that identifies each of the containers from the material member stage to the completed container stage.

SUMMARY

In general, a company that manages a filling line for containers (hereinafter also referred to as a "container filling company") often differs from a company that manages a manufacturing line for containers (hereinafter also referred to as a "container manufacturer"). Even if the container manufacturer has information linking an identifier indicated by an identification code applied to a container with data of processing details of the manufacturing line for containers and inspection results, this information is usually not shared with the container filling company.

To solve this problem, there is a demand for a highly-reliable production line management technology that allows a container filling company to manage a production line for filling containers with content by using identification codes applied to the containers.

In a production line that manufactures a wide variety of containers in small quantities, different types of containers corresponding to different types of products are manufactured on the same line. Also in a production line that manufactures a wide variety of products in small quantities, contents are filled into different types of containers corresponding to different types of products on the same production line. For example, after filling first type containers with a first type of content, second type containers are filled with a second type of content on the same production line.

However, the first type containers that have stayed upstream on the production line may merge into the production line for some reason when the second type containers are filled. As a result, in the manufacturing line for containers, there is a risk that a first type container may be packed and shipped with the second type containers. In the container filling line, there is a risk that the first type container may be filled with the second type of content, resulting in the production of a defective product in which the type of container and the type of content do not match.

Thus, there is a demand for highly reliable production line management technology that can detect mixing of different types of containers, such as different types of cans.

In production lines such as a manufacturing line for containers and a filling line for containers, sampling inspections of containers are often performed in the middle of the production line. An extracted container is returned to the production line after inspection.

However, when returning the extracted container to the production line, human error may result in the container being mistakenly returned to a step after the step to which it should be returned. For example, there is a risk that a container extracted at a point before the inspection step on the production line is returned to a point on the production line after the inspection step. This means that the container skips the inspection step. In this case, there is a risk that a defective container may be sent to a subsequent step without being detected in the inspection step.

Thus, there is a demand for highly reliable production line management technology that can detect human error during sampling inspection.

The disclosure has been made in view of the above circumstances, and an object of the disclosure is to provide a production line management system, a production line management method, a can management system, a can, and a manufacturing method for cans with high reliability such that individual containers can be identified and managed individually.

To achieve the above object, provided are a production line management system of the disclosure for managing a manufacturing line for containers and/or a filling line for containers. The production line management system includes a first reading unit for reading an identification code applied to each of the containers when each of the containers with the identification code indicating an identifier being information identifying each of the containers passes through a first point on the manufacturing line and/or the filling line, a second reading unit for reading the identification code applied to each of the containers after the first reading unit reads the identification code, and a computing unit for generating a database in which the identifier indicated by the identification code and relevant information on each of the containers are associated, and determine normality/abnormality of each of the containers by comparing the relevant information associated in the database with the identifier indicated by the identification code read in the second reading unit with setting information that is predetermined.

In the production line management system of the disclosure, the relevant information is preferably a first reading time at which the first reading unit reads the identification code, and the setting information is a set time that is predetermined.

A production line management method of the disclosure is for managing a manufacturing line for containers and/or a filling line for containers. The production line management method includes (a) reading an identification code applied to each of the containers when each of the containers with the identification code indicating an identifier being information identifying each of the containers passes through a first point on the manufacturing line and/or the filling line, (b) generating a database in which the identifier indicated by the identification code and relevant information about each of the containers are associated, (c) reading the identification code applied to each of the containers after the identification code is read by the first reading unit, and (d) determining normality/abnormality of each of the containers by comparing the relevant information associated in the database with the identifier indicated by the identification code read in the second reading unit with setting information that is predetermined.

In the production line management method of the disclosure, the relevant information is preferably a first reading time at which the first reading unit reads the identification code, and the setting information is a set time that is predetermined.

In this manner, in the production line management system and method of the disclosure, for each of the containers in which the identification code representing the identifier is applied to the container, when passing through the first point on the production line, the identification code applied to each of the containers is read, and the first reading time at which the identification code is read is recorded, and the normality/abnormality of the container is determined by comparing the first reading time associated with the identifier indicated by the identification code read by the second reading unit and the set time that is predetermined. This allows the production line for filling the container with the contents to be managed by the use of the identification code applied to the container.

In a management system for cans manufactured through a plurality of processing steps of the disclosure, a bottom portion of each of the cans includes a main bottom portion being dome-shaped or flat and constituting a main portion of the bottom portion, an annular portion formed in a portion of the bottom portion other than the main bottom portion, having an annular shape when viewed from a direction of a can axis, and having at least one of a convex shape and a concave shape in a cross-section perpendicular to the direction of the can axis, and an individual identification code applied to a side portion of the annular portion and corresponding to an individual identifier being information for identifying an individual can. The management system for cans includes a storage unit configured to store the individual identifier of each of the cans in association with step identifiers being pieces of information identifying the plurality of processing steps through which each of the cans is manufactured.

A can of the disclosure has a bottom portion. The bottom portion includes a main bottom portion being dome-shaped or flat and being a main portion of the bottom portion, an annular portion formed in a portion of the bottom portion other than the main bottom portion, having an annular shape when viewed from a direction of a can axis, and having at least one of a convex shape and a concave shape in a cross-section perpendicular to the direction of the can axis, and an individual identification code applied to a side portion of the annular portion and corresponding to an individual identifier being information for identifying an individual can.

A manufacturing method for cans of the disclosure includes (e) applying the individual identification code to a portion to be processed into the can bottom portion of a material member stamped out of sheet metal as a base material, or a portion to be processed into the can bottom portion of a portion to be stamped out as the material member of the sheet metal, and (0 performing a plurality of processing steps after performing step (e). The plurality of processing steps includes (g) reading the individual identification code applied in step (e), and (h) storing an individual identifier corresponding to the individual identification code read in step (g) in association with the plurality of step identifiers of the plurality of processing steps in a storage unit.

According to the disclosure, it is possible to provide a production line management system, a production line management method, a can management system, a can, and a manufacturing method for cans with high reliability such that individual containers can be identified and managed individually.

BRIEF DESCRIPTION OF DRAWINGS

FIGS. 7A-7D are diagrams showing a process history table, a printer step histogram, a necking step histogram, and a process history display screen of an inquiry terminal according to the fifth embodiment of the disclosure.

DESCRIPTION OF EMBODIMENTS

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

First Embodiment

Figure 1:
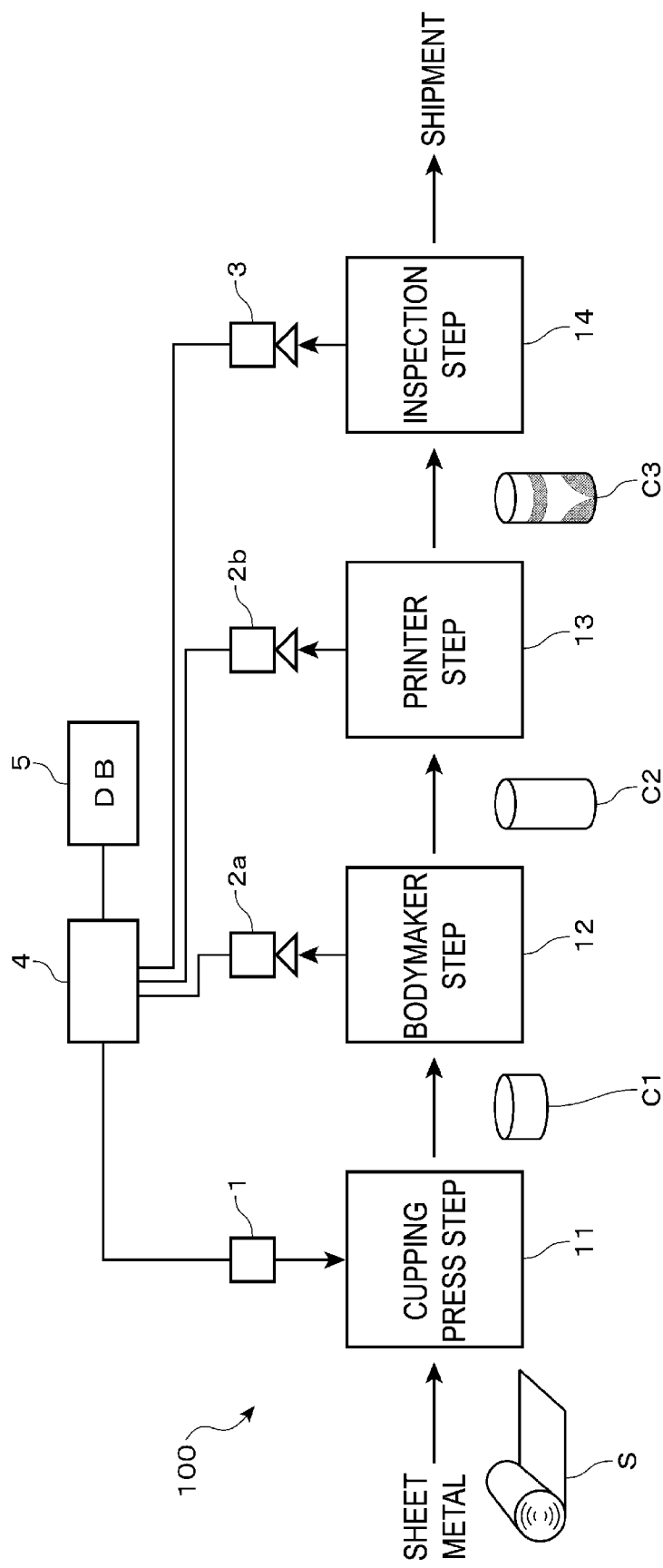
FIG. 1 is a block diagram illustrating a production line management system for managing a manufacturing line for containers, according to first and second embodiments of the disclosure.

Referring to FIG. 1, a first embodiment of the disclosure will be described. In the first embodiment, an example of detecting mixing of different types of cans will be described as a production line management system and method of managing a manufacturing line for containers.

Container Manufacturing Line

First, a container manufacturing line 100 for a two-piece can, which is a management target according to the present embodiment, will be described. As illustrated in FIG. 1, the container manufacturing line 100 includes a cupping press step 11, a bodymaker step 12, a printer step 13, and an inspection step 14.

In the cupping press step 11, circular material members C1 are stamped out and shaped into cup shapes from sheet-like sheet metal S as a base material uncoiled from a coil. The sheet metal S is stamped by eight stamping units (not illustrated) arranged in a direction perpendicular to a transport direction of the sheet metal S.

Subsequently, in the bodymaker step 12, eight lanes (not illustrated) are used to form can bodies C2 side by side by drawing the cup-shaped material members C1 to thin can trunk portions and further form can bottom portions.

Subsequently, in the printer step 13, each of the can bodies C2 is held by one of mandrels (not illustrated) on a mandrel wheel and pressed against a printer plate (not illustrated) for coating and printing on the can trunk portion, and then being further dried and baked.

Subsequently, in the inspection step 14, defects on the inside and outside surfaces of a can body C3 after the printer step 13 are inspected. As a result of the inspection, can bodies C3 determined to be defective are removed from the production line, and only can bodies C3 determined to be non-defective are shipped.

Note that the container manufacturing line 100 is not limited to including all of the processing steps 11 to 13 described above. In addition to the processing steps 11 to 13 described above, the container manufacturing line 100 may further include various steps such as a washing step and a coating step. The inspection step 14 may be divided into a plurality of steps.

Overall Configuration of Production Line Management System

Next, a production line management system for managing the container manufacturing line 100 will be described.

As illustrated in FIG. 1, the production line management system includes a code applying unit 1, a bodymaker step reading unit 2a, a printer step reading unit 2b, an inspection step reading unit 3, a computing unit 4, and a database 5.

The code applying unit 1 applies an identification code to the container in the cupping press step 11 as a code applying unit that applies the identification code indicating an identifier, which is information for identifying the container.

In the present embodiment, in the cupping press step 11, before the individual material members C1 are stamped out and separated from the sheet metal S, the identification codes are applied to portions of the sheet metal S that are to be stamped out in circular shapes as the material members C1. Each identification code is preferably applied to a portion of the sheet metal S that is to be the bottom portion of the can, which is less deformed during the forming step, particularly near the center of the can bottom portion. This allows each of the containers to be managed using the identifier from the material member stage to the completed can body stage, even before the container is formed.

Note that while the identification code is applied in the cupping press step 11 in the present embodiment, the step for applying the identification code is not limited to any particular step. For example, the identification code may be applied to the formed can body C2 in the bodymaker step 12.

The identification code is not limited provided that it can indicate an identifier, which is information for identifying a container. For example, the identification code may be characters such as alphanumeric characters, a symbol, a bar code, or a two-dimensional code. The method of applying the identification code to the container is also not limited. For example, the identification code may be printed with ink, engraved, or laser etched on the container. Also, for example, a sticker or a component displaying the identification code may be affixed to the container. Thus, the code applying unit 1 may be any one of, for example, a printing device, an engraving device, a laser irradiation device, or a sticker sticking device (the same applies to other embodiments).

The identification code is not limited to being visually or optically readable and may also be electromagnetically readable in a contact or non-contact manner. An example of such an identification code is a chip that can electromagnetically transmit a signal of a code indicating an identifier, such as a radio frequency identifier (RFID). A method of applying such a chip to a container is not particularly limited and, for example, the chip may be affixed to the container or embedded in the container. Thus, the code applying unit 1 may be, for example, any kind of device that is provided with a chip applying mechanism for applying a chip to a container or a chip embedding mechanism for embedding a chip in a container (the same applies to other embodiments).

The bodymaker step reading unit 2a reads the identification codes applied to the individual containers to be processed in the bodymaker step 12.

In the production line management system according to the present embodiment, the printer step reading unit 2b reads the identification codes applied to the containers to be processed at the printer step 13 as a first point, thus serving as a first reading unit for reading the identification codes applied to the individual containers when the containers to which the identification codes are applied pass through the first point on the manufacturing line.

Note that, instead of the printer step reading unit 2b, the bodymaker step reading unit 2a may be used as the first reading unit. Alternatively, the first point may be set between the processing steps, and the identification code applied to the container may be read during transportation.

The inspection step reading unit 3 reads the identification code applied to the container to be inspected in the inspection step 14 downstream from the printer step 13, serving as a second reading unit for reading the identification code applied to the container, when the container to which the identification code is applied passes through a second point downstream from the first point on the manufacturing line.

Note that the bodymaker step reading unit 2a, the printer step reading unit 2b, and the inspection step reading unit 3 are not limited provided that these units can read an identification code. For example, when the identification code is optically readable, an imaging device such as a camera is preferred. Alternatively, when the identification code is electromagnetically readable, a reception device such as a reader that receives signals from a chip such as an RFID chip is preferred.

Information of the read identification code or information of the identifier indicated by the identification code is sent to the computing unit 4.

The computing unit 4 generates the database 5 in which an identifier ID indicating the identification code is associated with a first reading time T1 at which the printer step reading unit 2b reads the identification code.

A clock function for determining the first reading time T1 is preferably included in the computing unit 4, to which the identification code is sent in real time from the printer step reading unit 2b. Alternatively, the first reading unit, such as the printer step reading unit 2b, may have the clock function and may send the first reading time T1 together with the read identification code to the computing unit 4.

In the present embodiment, in the database 5, the identifier indicated by the identification code applied to each container is associated with information on the bodymaker step 12 and the printer step 13, and the result of the inspection in the inspection step 14, in addition to the first reading time T1.

Note that the computing unit 4 may be a computer or may be provided on a cloud computing system via the Internet.

The database 5 may also be constructed as data in a storage device or may be provided on a cloud computing system via the Internet.

Table 1 shows an example of the contents of the database 5.

TABLE 1

| ID | Cupping press step | Bodymaker step | Printer step | T1 |
|---|---|---|---|---|
| . | . | . | . | . |
| . | . | . | . | . |
| . | . | . | . | . |
| 9D33FA21 | 2 | 3 | 5 | 2020/*/* 13:40:21 |
| 9D33FA31 | 3 | 3 | 1 | 2020/*/* 14:41:22 |
| 9D33FA41 | 4 | 2 | 4 | 2020/*/* 09:34:27 |
| . | . | . | . | . |
| . | . | . | . | . |

In the database 5 shown in Table 1, as information for the individual steps, the number in the cupping press step indicates the number of a stamping unit (not illustrated) for stamping out the material member C1 from the sheet metal S in the cupping press step. The number in the bodymaker step indicates the lane number of the bodymaker. The number in the printer step indicates the number of the mandrel that holds the can body in the printer step. Note that the same applies to other tables.

Further, the computing unit 4 determines the normality/abnormality of each of the containers by comparing the first reading time T1 associated in the database 5 with the identifier indicating the identification code read by the inspection step reading unit 3 with a predetermined set time Th.

In the present embodiment, an example will be described in which the production line management system detects mixing of different types of cans in the container manufacturing line 100, when first type two-piece cans are manufactured in the morning and then second type two-piece cans are manufactured in the afternoon on the same line.

If a first type two-piece can that has stayed upstream on the production line merges into the production line during the manufacture of the second type two-piece cans for whatever reason, there is a risk that the stray first type two-piece can may be packed and shipped with the second type two-piece cans.

Thus, to detect the mixing of different types of cans, the computing unit 4 determines that the container is abnormal when the first reading time T1 is ahead of a set time. A predetermined set time Th is preferably set to a time after the end of the manufacturing period for the first type two-piece cans in the morning and before the start of the manufacturing period for the second type two-piece cans in the afternoon. Here, the set time Th is set to "noon (12:00:00)".

Specifically, in Table 1, the first reading time T1: "13:40:21" associated with the identifier ID: "9D33FA21" is after "noon", which is the set time Th, so the computing unit 4 determines that the two-piece can with that ID is "normal".

On the other hand, in Table 1, the first reading time T1: "09:34:27" associated with the identifier ID: "9D33FA41" is before noon, which is the set time Th, so the computing unit 4 determines that the two-piece can with that ID is "abnormal".

This makes it easy to detect the mixing of different types of cans by using the first reading time T1 without having to associate the identifier ID with the type of two-piece can.

MODIFIED EXAMPLE

In the first embodiment described above, an example has been described in which the first reading time is used to detect mixing of different types of cans. The first reading time can also be used in various ways in managing the production line.

For example, when a defect occurs in a step on the manufacturing line, it is necessary to remove the two-piece cans manufactured in the step in which the defect occurred. In particular, when a defect on the manufacturing line is found after the two-piece cans are packed, usually, all the packed two-piece cans are inspected outside the manufacturing line. In such a case, it is necessary to either visually inspect the two-piece cans for defects or discard all the packed two-piece cans.

A production management system according to the present modified example has substantially the same configuration as in the first embodiment, except that the second reading unit reads the identification code outside the manufacturing line. However, if the defect occurs in a step on the manufacturing line, the production management system selectively removes two-piece cans manufactured during a time period from the occurrence of a defect to the completion of adjustment. Examples of the second reading unit include, for example, a hand-held code reader.

Note that the timing of reading the identification code by the second reading unit can be any time after the first reading unit has read the identification code.

In the present modified example, the set time Th has a predetermined time range. The time range is preferably a time period from the occurrence of the defect to the completion of the adjustment.

The computing unit 4 determines that the container is abnormal when the first reading time T1 is within the predetermined time range Th. For example, when the time range of the set time Th is "14:00:00" to "15:00:00", in the database 5 in Table 1 described in the first embodiment, since the first reading time T1: "14:41:22" of the two-piece can with the ID "9D33FA31" is within this time range, the computing unit 4 determines that this two-piece can is abnormal.

Thus, even when a defect is found out on the manufacturing line after the two-piece cans are packed, it is unnecessary to visually inspect all of the two-piece cans for defects and discard all the packed two-piece cans.

Second Embodiment

Next, a second embodiment of the disclosure will be described. In the second embodiment, also referring to FIG. 1, an example of detecting the mixing of different types of cans in a manufacturing line for containers will be described as a production line management system and method of managing a manufacturing line for containers.

Note that the same components as in the first embodiment described above will be denoted by the same reference symbols, and detailed description thereof will be omitted.

In the first embodiment described above, in detecting the mixing of different types of cans, the computing unit 4 sets the set time Th to noon and determines that a container is abnormal when the first reading time T1 is ahead of the set time Th. However, as to be described in the present embodiment, the set time Th is not limited to a fixed time.

In the present embodiment, the computing unit 4 associates, in addition to the first reading time T1, the identifier indicated by the identification code in the database 5 with a second reading time T2 at which the inspection step reading unit 3 serving as the second reading unit reads the identification code.

Then, to detect the mixing of different types of cans, the computing unit 4 determines that the container is abnormal if the first reading time T1 is ahead of the set time Th. In the present embodiment, the predetermined set time Th is set to a time ahead of the second reading time T2 by a predetermined time ΔT.

Note that the predetermined time ΔT can be set as appropriate in accordance with the production line.

Here, Table 2 shows an example of the contents of the database 5.

TABLE 2

| ID | Cupping press step | Bodymaker step | T1 | T2 |
|---|---|---|---|---|
| . | . | . | . | . |
| . | . | . | . | . |
| . | . | . | . | . |
| 9D33FA21 | 2 | 3 | 2020/*/* 13:40:21 | 2020/*/* 13:50:21 |
| 9D33FA31 | 3 | 3 | 2020/*/* 14:41:22 | 2020/*/* 14:51:22 |
| 9D33FA41 | 4 | 2 | 2020/*/* 09:34:27 | 2020/*/* 14:53:38 |
| . | . | . | . | . |
| . | . | . | . | . |
| . | . | . | . | . |

In the database 5 shown in Table 2, as in Table 1, as information for the individual steps, the number in the cupping press step indicates the number of the stamping unit (not illustrated) for stamping out the material member C1 from the sheet metal S in the cupping press step. The number in the bodymaker step indicates the lane number of the bodymaker. Note that, in Table 2, the data of the printer step in Table 1 is omitted.

In the present embodiment, the container manufacturing line 100 is managed. In this line, the first type two-piece cans are manufactured in the morning and then the second type two-piece cans are manufactured in the afternoon on the same line.

If a first type two-piece can that has stayed upstream on the manufacturing line 100 merges into the production line during the manufacture of the second type two-piece cans, there is a risk that the stray first type two-piece can may be packed and shipped with the second type two-piece cans.

Thus, to detect the mixing of different types of cans, the computing unit 4 compares, for each of the containers, the first reading time T1 associated with the identifier indicated by the identification code read by the inspection step reading unit 3 in the database 5, with the set time Th that is ahead of the second reading time T2 by the predetermined time ΔT by, for example, two hours. Then, when the first reading time T1 is ahead of the set time, the computing unit 4 determines that the container is abnormal, that is, a different type of can.

Specifically, in Table 2, for the two-piece can with the identifier ID: "9D33FA21", the set time Th is "11:50:21", which is two hours ahead of the second reading time T2: "13:50:21". Then, the computing unit 4 compares this set time Th: "11:50:21" with the first reading time T1: "13:40:21". In this case, since the first reading time T1 is after the set time Th, the computing unit 4 determines that the two-piece can with that ID is "normal".

On the other hand, in Table 2, for the two-piece can with the identifier ID: "9D33FA41", the set time Th is "12:53:38", which is two hours ahead of the second reading time T2: "14:53:38". Then, the computing unit 4 compares this set time Th: "12:53:38" with the first reading time T1: "09:34:27". In this case, since the first reading time T1 is ahead of the set time Th, the computing unit 4 determines that the two-piece can with that ID is "abnormal".

Third Embodiment

Figure 2:
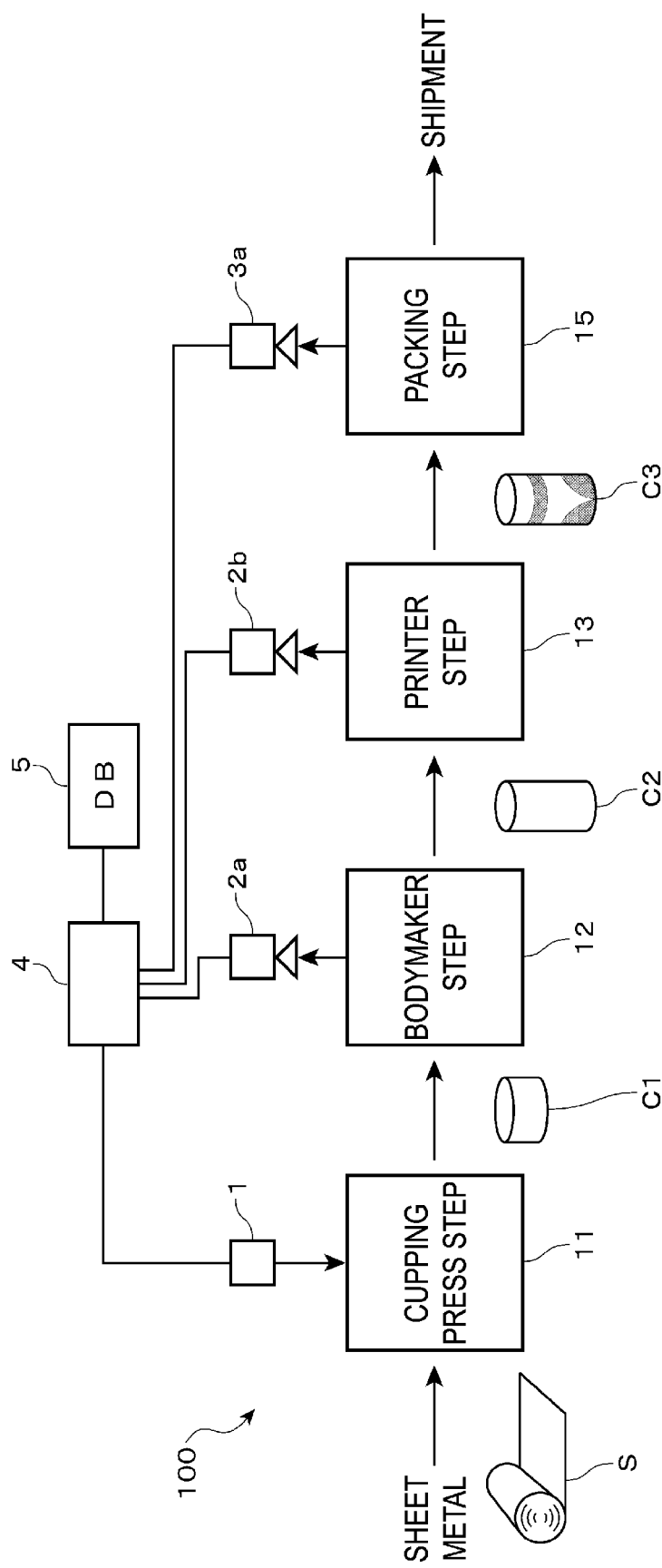
FIG. 2 is a block diagram illustrating a production line management system for managing a manufacturing line for containers, according to a third embodiment of the disclosure.

Next, a third embodiment of the disclosure will be described with reference to FIG. 2. In the third embodiment, an example of detecting a container mistakenly returned to a subsequent step on the production line after a sampling inspection on the manufacturing line for containers will be described as a production line management system and method of managing a manufacturing line for containers.

Note that the same components as in the first embodiment described above will be denoted by the same reference symbols, and detailed description thereof will be omitted.

In the present embodiment, a packing step reading unit 3a is provided as the second reading unit for reading the identification code applied to the container when the container to which the identification code is applied passes through the second point downstream from the first point on the manufacturing line. The packing step reading unit 3a reads the identification code applied to the container to be packed in a packing step 15 downstream from the printer step 13.

Then, the computing unit 4 generates the database 5 in which the identifier ID indicated by the identification code is associated with the first reading time T1 at which the printer step reading unit 2b reads the identification code and the second reading time T2 at which the packing step reading unit 3a reads the identification code.

In the present embodiment, as in the first embodiment, the identifier ID is also associated with the information about the bodymaker step 12 and the printer step 13 in the database 5.

Table 3 shows an example of the contents of the database 5.

TABLE 3

| ID | Cupping press step | Bodymaker step | Printer step | T1 | T2 |
|---|---|---|---|---|---|
| . | . | . | . | . | . |
| . | . | . | . | . | . |
| . | . | . | . | . | . |
| 9D33FA21 | 2 | 3 | 5 | 2020/*/* 13:40:21 | 2020/*/* 13:55:21 |
| 9D33FA31 | 3 | 3 | 1 | 2020/*/* 13:50:22 | 2020/*/* 13:55:22 |
| 9D33FA41 | 4 | 2 | 4 | 2020/*/* 13:40:24 | 2020/*/* 13:55:23 |
| . | . | . | . | . | . |
| . | . | . | . | . | . |

Further, the computing unit 4 determines the normality/abnormality of each of the containers by comparing the first reading time T1 associated in the database 5 with the identifier indicated by the identification code read by the packing step reading unit 3a with a predetermined set time Th.

In the present embodiment, an example of detecting a container mistakenly returned to a subsequent step of the production line after a sampling inspection on the container manufacturing line 100 will be described.

There is a risk that a container extracted from a point on the production line before the inspection step may be returned to a point on the production line after the inspection step, resulting in the container to skip the inspection step. In this case, there is a risk that a defective container may be sent to a subsequent step without being detected in the inspection step.

Thus, to detect a container mistakenly returned to the subsequent step on the production line after the sampling inspection, the computing unit 4 determines that the container is abnormal if the first reading time T1 is after the set time Th. The predetermined set time Th is set to a time ahead of the second reading time T2 by a predetermined time ΔT by, for example, 10 minutes. Note that the predetermined time ΔT can be set as appropriate in accordance with the production line.

Specifically, in Table 3, the second reading time T2 associated with the identifier ID: "9D33FA21" is "13:55:21", and the set time Th, which is ahead of the second reading time T2 by ΔT (=10 minutes), is "13:45:21". As a result, the first reading time T1 (="13:40:21") associated with the identifier ID: "9D33FA21" is ahead of the set time Th (="13:45:21"), so the computing unit 4 determines that the two-piece can with that ID is "normal".

On the other hand, in Table 3, the second reading time T2 associated with the identifier ID: "9D33FA31" is "13:55:22", and the set time Th, which is ahead of the second reading time T2 by ΔT (=10 minutes), is "13:45:22". As a result, the first reading time T1 (="13:50:22") associated with the identifier ID: "9D33FA31" is after the set time Th (="13:45:22"), so the computing unit 4 determines that the two-piece can with that ID is "abnormal".

This prevents the two-piece can subjected to the sampling inspection from being sent to a subsequent step due to human error.

In this manner, the identifier ID and the time facilitate detection of human errors during the sampling inspection. Further, since the predetermined set time Th is a time ahead of the second reading time T2 by the predetermined time ΔT, the set time can be set individually for each two-piece can. This allows individual two-piece cans to be accurately managed using the time.

Fourth Embodiment

Figure 3:
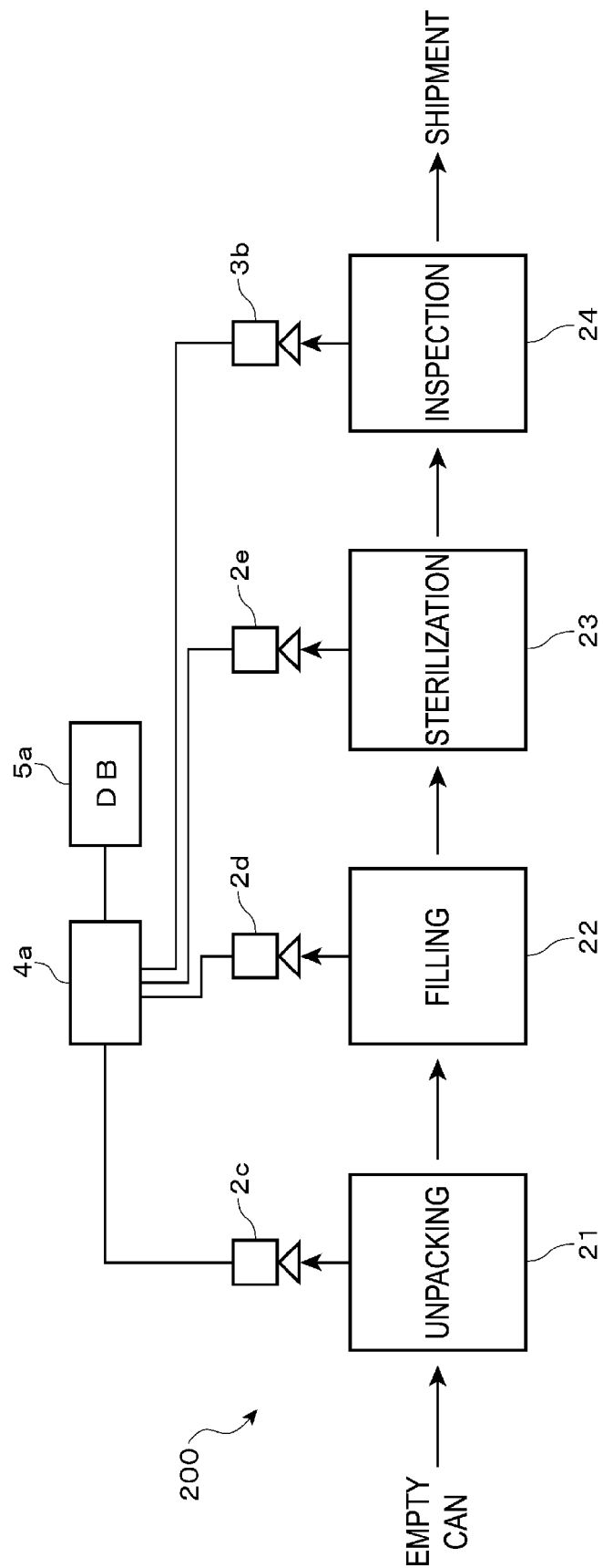
FIG. 3 is a block diagram illustrating a production line management system for managing a filling line for containers, according to a fourth embodiment of the disclosure.

Referring to FIG. 3, a fourth embodiment of the disclosure will be described. In the fourth embodiment, a production line management system and method for managing a container filling line for filling contents into containers manufactured on the container manufacturing line 100 according to the first embodiment will be described.
Container Filling Line First, a container filling line 200, which is a management target according to the present embodiment, will be described. As illustrated in FIG. 3, the container filling line 200 includes an unpacking step 21, a filling step 22, a sterilization step 23, and an inspection step 24.

In the unpacking step 21, the containers that have been packed, loaded on pallets, and transported are unpacked and washed. The transported containers already have identification codes that indicate identifiers, each of which being information for identifying each container, as in the first embodiment described above.

In the filling step 22, a filler is used to fill the container with the contents, and a seamer seals the container after filling. In addition, a level checker inspects the filling volume of the contents in the container.

In the sterilization step 23, the container filled with contents is introduced by a loader into a heat sterilizer such as a retort (autoclave) or a pasteurizer. The container is heated by the heat sterilizer for a predetermined amount of time (e.g., two hours), and then unloaded from the heating device by an unloader.

In the inspection step 24, information such as shelf life is printed on a notation surface, and the printing is inspected. Further, a level checker again inspects the filling volume of the contents in the container.

Note that the container filling line 200 is not limited to including all of the processing steps 21 to 24 described above. In addition to the processing steps 21 to 24 described above, the container filling line 200 may further include other various steps.
Overall Configuration of Production Line Management System Next, a production line management system for managing the container filling line 200 will be described.

As illustrated in FIG. 3, the production line management system includes an unpacking step reading unit 2c, a filling step reading unit 2d, a sterilization step reading unit 2e, an inspection step reading unit 3b, a computing unit 4a, and a database 5a.

The unpacking step reading unit 2c, the filling step reading unit 2d, the sterilization step reading unit 2e, and the inspection step reading unit 3b read the identification codes applied to the containers in the unpacking step 21, the filling step 22, the sterilization step 23, and the inspection step 24 in the same manner as the reading units 2a, 2b, and 3 in the first embodiment.

Note that the reading units 2c to 2e and 3b are not limited provided that they can read an identification code. For example, when the identification code is optically readable, an imaging device such as a camera is preferred. Alternatively, when the identification code is electromagnetically readable, a reception device such as a reader that receives signals from a chip such as an RFID chip is preferred.

In the production line management system of the present embodiment, the filling step reading unit 2d reads the identification codes applied to the individual containers to be processed at the filling step 22 as a first point, serving as a first reading unit for reading the identification codes applied to the individual containers, when the containers to which the identification codes are applied pass through the first point on the manufacturing line.

Note that, instead of the filling step reading unit 2d, the unpacking step reading unit 2c, for example, may be used as the first reading unit. Alternatively, the first point may be set between the processing steps, and the identification code applied to the container may be read during transportation.

The inspection step reading unit 3b reads the identification codes applied to the containers to be inspected in the inspection step 24 downstream from the filling step 22, serving as a second reading unit for reading the identification code applied to the container, when the containers to which the identification codes are applied pass through a second point downstream from the first point on the manufacturing line.

The computing unit 4a generates the database 5a in which the identifier ID indicated by the identification code is associated with the first reading time T1 at which the filling step reading unit 2d reads the identification code and the second reading time T2 at which the inspection step reading unit 3b reads the identification code.

Note that a clock function for determining the first reading time T1 and the second reading time T2 may be included in the computing unit 4a, or in each of the reading units 2c and 3b.

Note that, as in the first embodiment described above, the computing unit 4a may be a computer, or may be provided on a cloud computing system via the Internet. The database 5a may also be constructed as data in a storage device, or may be provided on a cloud computing system via the Internet.

Table 4 shows an example of the contents of the database 5a.

TABLE 4

| ID | T1 | T2 |
|---|---|---|
| . | . | . |
| . | . | . |
| 9D33FA21 | 2020/*/* 10:25:21 | 2020/*/* 12:40:21 |
| 9D33FA31 | 2020/*/* 10:25:22 | 2020/*/* 12:40:22 |
| 9D33FA41 | 2020/*/* 12:20:24 | 2020/*/* 12:40:23 |
| . | . | . |
| . | . | . |

Note that, in addition to the first reading time T1 and the second reading time T2, the identifier may be associated in the database 5a with information about the unpacking step 21, the filling step 22 and the sterilization step 23, and the result of the inspection in the inspection step 24.

Further, the computing unit 4a determines the normality/abnormality of each of the containers by comparing the first reading time T1 associated in the database 5a with the identifier indicated by the identification code read by the inspection step reading unit 3b with a predetermined set time Th.

In the present embodiment, an example of detecting a filled container mistakenly returned to a step after the sterilization step 23 after a sampling inspection prior to the sterilization step 23 in the container filling line 200 will be described. In such a case, there is a risk that the filled container that has not passed through the sterilization step 23 will be shipped.

To detect human error in the sampling inspection, the computing unit 4a determines that the container is abnormal if the first reading time T1 is after the set time Th. The predetermined set time Th is set to a time ahead of the second reading time T2 by a predetermined time ΔT, for example, a time ahead of the second reading time T2 by a time required for the heat sterilization (e.g., two hours). Note that the predetermined time ΔT can be set as appropriate in accordance with the production line.

Specifically, in Table 4, the second reading time T2 associated with the identifier ID: "9D33FA21" is "12:40:21", and the set time Th, which is ahead of the second reading time T2 by ΔT (=two hours), is "10:40:21". As a result, the first reading time T1 (="10:25:21") associated with the identifier ID: "9D33FA21" is ahead of the set time Th (="10:40:21"), so the computing unit 4 determines that the container with that identifier ID is "normal".

On the other hand, in Table 4, the second reading time T2 associated with the identifier ID: "9D33FA41" is "12:40:23", and the set time Th, which is ahead of the second reading time T2 by ΔT (=two hours), is "10:40:23". As a result, the first reading time T1 (="12:20:24") associated with the identifier ID "9D33FA41" is after the set time Th (="10:40:23"), so the computing unit 4 determines that the container with that identifier ID is "abnormal".

This prevents the filled container subjected to the sampling inspection from being sent to a subsequent step due to human error.

In this manner, the identifier ID and the time facilitate detection of human errors during the sampling inspection. Further, since the predetermined set time Th is a time ahead of the second reading time T2 by the predetermined time ΔT, the set time can be set individually for each two-piece can. This allows accurate management using the first reading time T1 time without associating the identifier ID with the type of the container.

Thus, even when the information in which the identifier indicated by the identification code applied to the container is associated with data about the processing details and inspection results of the manufacturing line for containers is not shared between the container manufacturer and the container filling company, the container filling company can use the identification codes applied to the containers and the times to manage the production line for filling the containers with contents.

When comparing the first reading time T1 with the set time Th, with a batch processing step such as the sterilization step 23 introduced in between, the set time Th may be a fixed time without using the second reading time T2.

MODIFIED EXAMPLES

In the fourth embodiment described above, the container is determined to be "abnormal" if the first reading time T1 is after the set time Th. However, for example, the computing unit 4a may determine that the container is "abnormal" when the time at which the unpacking step reading unit 2c reads the identification code is the first reading time in the unpacking step 21 as the first point and the first reading time T1 associated with the identifier indicated by the identification code read in the inspection step 24 or in a packing step (not illustrated) after the inspection step as the second point is ahead of the predetermined set time Th. This allows, for example, the detection of mixing of different types of cans when a different type of container unpacked from another pallet in the unpacking step 21 strays for some reason and then merges into the filling line.

The disclosure is not limited only to the embodiments described above, and various modifications can be made within the scope of the disclosure. For example, in the first to third embodiments described above, the production management system for can bodies for two-piece cans in which the can bottom portion and the can trunk portion are formed as a single piece has been described. However, the disclosure can also be applied to production management of three-piece cans and bottle cans. The can body may be a steel can made of steel sheet metal or an aluminum can made of aluminum or aluminum alloy sheet metal. The can body may have a dome-shaped recessed can bottom portion or may have a flat can bottom portion.

The disclosure can also be applied to production line management for manufacturing articles such as PET bottles, glass bottles, pouches, boxes, paper packaging, lids, caps, or cups, and production line management for filling containers with contents.

Although the embodiments described above refer to an example of managing either a manufacturing line for containers or a filling line for containers, the disclosure can also manage both a manufacturing line for containers and a filling line for filing containers.

In the embodiments described above, an example of determining the abnormality of the container based on the time as information related to the container has been described. In the disclosure, the information related to the container is not limited to the time, and may include one or more pieces of process information, such as machine speed, lane number, coil information, pocket number, machine number, printing information, pressure information, and environmental information (temperature, humidity, illuminance, cleanliness, and vibration).

In that case, the computing unit, for each of the containers, may determine that a container is abnormal and remove the corresponding container when the relevant information associated in the database with the identifier indicated by the identification code read by the second reading unit matches predetermined setting information, such as a specific machine, a specific lane number, a specific pocket number, or a specific machine number, or matches a condition of specific coil information, specific printing information, specific pressure information, or specific environmental information (temperature, humidity, illuminance, cleanliness, or vibration). The normality/abnormality of the container may be determined by comparing the setting information, which is a combination of the plurality of pieces of process information, with the plurality of pieces of information.

Further, in the embodiments and modified examples described above, the normality/abnormality of the container may be determined by combining the time and one or more pieces of the process information.

Fifth Embodiment

Next, a fifth embodiment of the disclosure will be described.

Note that in the following description and in the drawings, the same names or the same names in parentheses will be given to portions that perform the same functions as those of the embodiments described above, and duplicated descriptions will be appropriately omitted as appropriate.

Figure 4A:
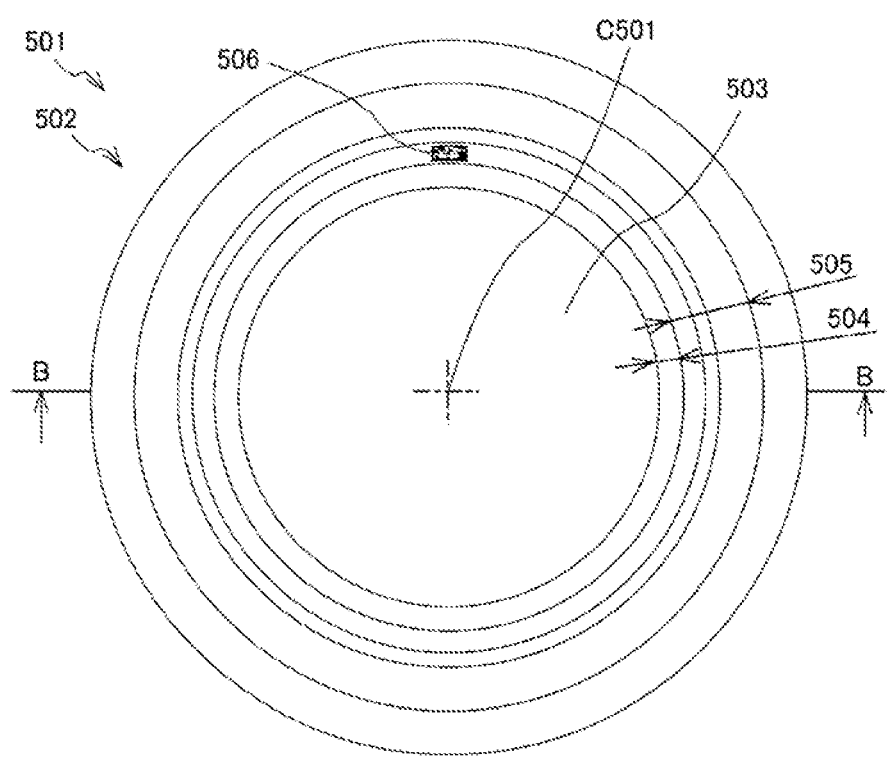
FIGS. 4A and 4B are diagrams illustrating an individual can manufactured according to a fifth embodiment of the disclosure.
Figure 4B:
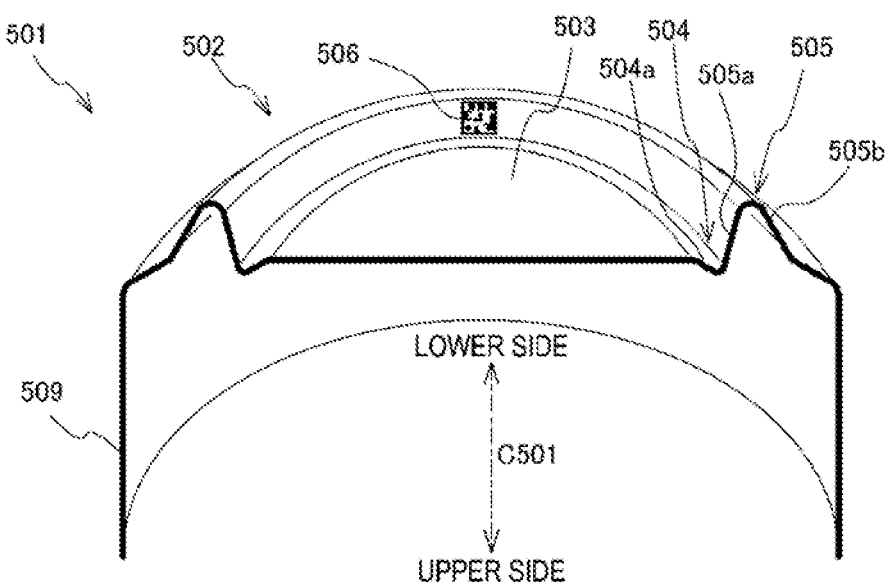

FIGS. 4A and 4B are diagrams for illustrating an individual can 501 manufactured according to the fifth embodiment.

FIG. 4A is a diagram illustrating the can 501 viewed from a bottom portion 502 side (in a direction of a can axis C501, which is the central axis of the can 501).

FIG. 4B is a perspective view of part of a shape of the can 501 along a cross section perpendicular to the can axis C501 (cross-section taken along line B-B in FIG. 4A).

The can 501 is, for example, a two-piece can, a three-piece can, or a bottle can.

The bottom portion 502 of the can 501 includes a main bottom portion 503, a groove portion 504 (annular section), and a projection portion 505 (annular portion).

The main bottom portion 503 constitutes a main part of the bottom portion 502. The main bottom portion 503 is formed flat. Note that the main bottom portion 503 may be formed in a dome shape that bulges toward an upper side (neck portion side) along the can axis C501.

The groove portion 504 and the projection portion 505 are provided in a region of the bottom portion 502 other than the main bottom portion 503, and are annular portions provided around the main bottom portion 503 surrounding the main bottom portion 503. The groove portion 504 and the projection portion 505 are arranged in this order toward the periphery of the bottom portion 502.

As illustrated in FIG. 4B, the cross-sectional shape of the groove portion 504 is concaved toward the upper side (neck portion side) along the can axis C501.

The projection portion 505 is a portion that forms a chime portion on the bottom side of the can 501. The projection portion 505 is arranged so as to be continuous around the periphery of the groove portion 504.

As illustrated in FIG. 4B, the cross-sectional shape of the projection portion 505 is a convex shape projecting in a mountain shape toward a lower side along the can axis C501.

An individual identification code 506 is applied to an inner surface 505a of the projection portion 505 (inner circumferential side of the outer surface of the projection portion 505 projecting in the mountain shape). The individual identification code 506 is a code that encodes an individual identifier, which is identification information of the individual can 501. The individual identification code 506 according to the embodiment is a two-dimensional code and is applied to the projection portion 505 by laser printing.

Note that the position to which the individual identification code 506 is applied is not limited to the inner surface of the projection portion 505, and may be an outer surface 505b of the projection portion 505 or a side surface 504a of the groove portion 504.

The can 501 is not limited to a configuration including both the groove portion 504 and the projection portion 505, and need only include at least one of them.

Here, the manufactured cans 501 are shipped to a manufacturer for manufacturing beverage products or the like, and this manufacturer fills the cans 501 with beverages or the like. Thus, final products such as beverages, which are the final product forms, are manufactured. In some cases, the manufacturer of beverage products or the like may apply product information, such as the lot number of the final product and shelf life of the final product, to the main bottom portion 503 by laser printing or the like. In this case, the configuration in which the individual identification code 506 is applied to the main bottom portion 503 of the can 501 has a disadvantage that, unlike the embodiment, the area for applying the product information is limited to a small area. In addition, in this configuration, there is a possibility that the individual identification code 506 and the product information will overlap. In this case, there is the disadvantage that the product information is difficult to read.

In the embodiment, the individual identification code 506 is applied to the inner surface 506a of the projection portion 505 or the like. Thus, the product information can be applied to the main bottom portion 503 as in known methods. Therefore, this disadvantage does not occur. In the configuration in which the individual identification code 506 is applied to the inner surface 505a of the projection portion 505 or the side surface 504a of the groove portion 504, the individual identification code 506 is less visible from the outside, so the quality of the can 501 and the final product is not impaired.

In the following description, a configuration in which the individual identification code 506 is applied to an inner surface of the projection portion 505 or the like is mainly described. However, in a configuration in which the individual identification code 506 is applied to the inner surface of the projection portion 505 or the side surface of the groove portion 504, the laser irradiation position of a code printing device 524 (described later) or the like may be changed as appropriate.

Note that the can 501 can also be applied to the containers according to the first to fourth embodiments as appropriate. In this case, for example, a code applying step performed by the code printing device 524 (code applying unit) may be performed between the bodymaker step and the printer step.

Configuration of Can Management System 510

Figure 5:
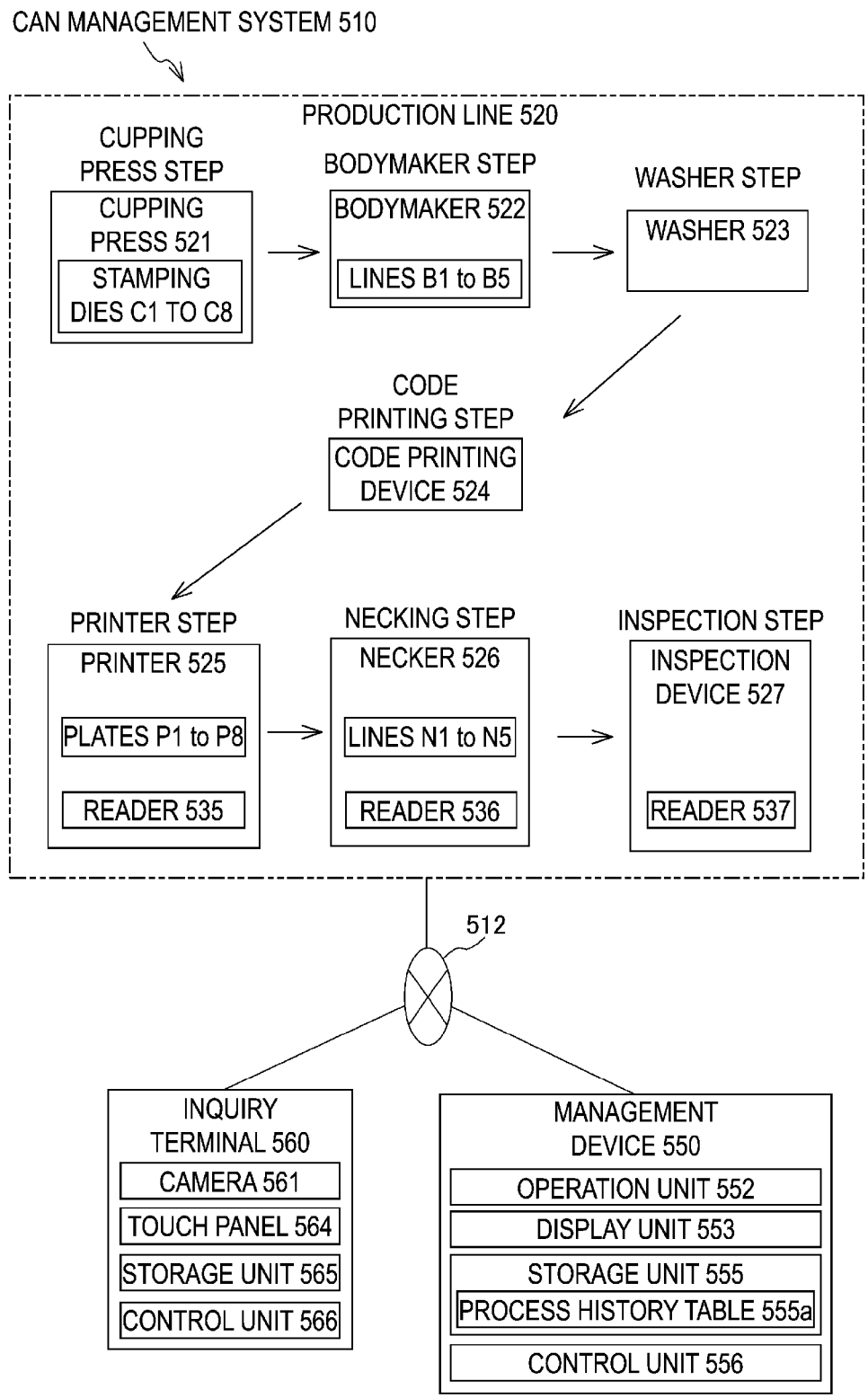
FIG. 5 is a diagram illustrating the overall configuration of a can management system according to the fifth embodiment of the disclosure.

FIG. 5 is a diagram illustrating an overall configuration of a can management system 510 according to the fifth embodiment.

Figure 6A:
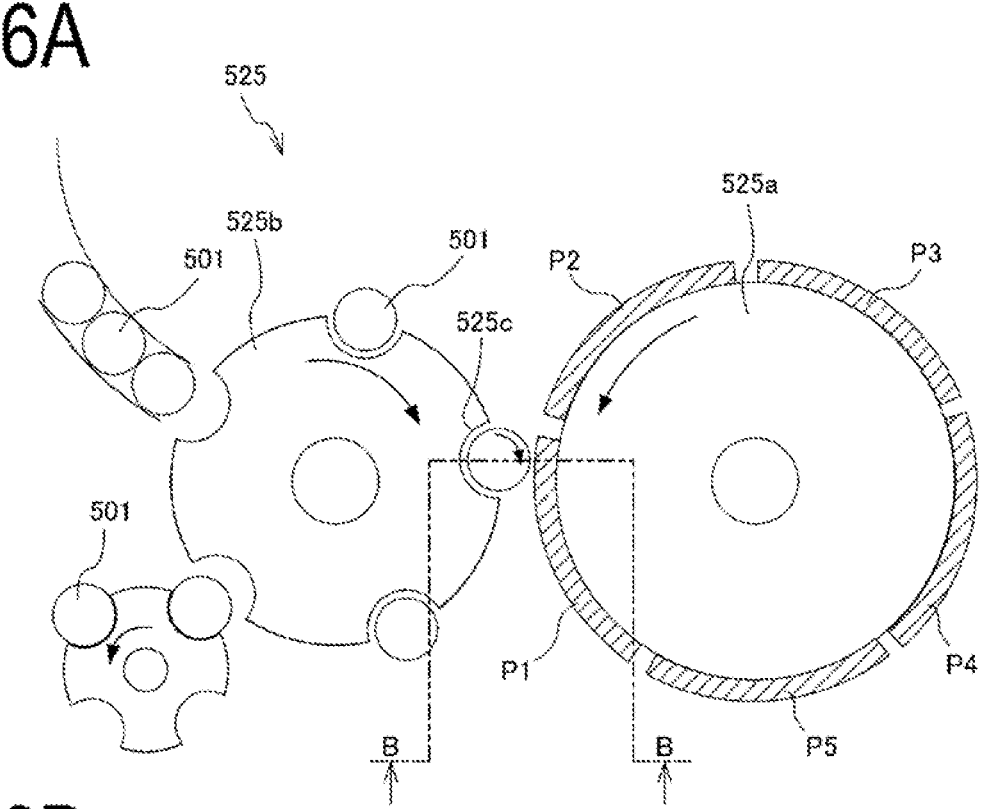
FIGS. 6A-6B are diagrams illustrating a configuration of a printer according to the fifth embodiment of the disclosure.
Figure 6B:
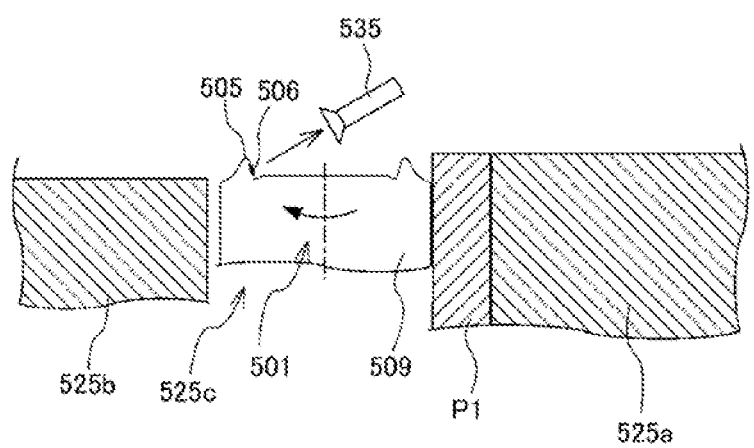

FIGS. 6A and 6B are diagrams illustrating a configuration of a printer 525 according to the fifth embodiment.

FIG. 6A is a diagram of the printer 525 as viewed from a rotation axis direction of a blanket wheel 525a, a mandrel wheel 525b, and the like.

FIG. 6B is an enlarged view of a partial cross section (cross section taken along line B-B) of FIG. 6A.

FIGS. 7A-7D are diagrams showing a process history table 555a, a printer step histogram H525, a necking step histogram H526, and a process history display screen 564a of an inquiry terminal 560 according to the fifth embodiment.

In the embodiment, an intermediate body until the material member is processed into the completed body of the can 501 is also referred to as the can 501 as appropriate.

The can management system 510 is a system that manages a production line 520 of the cans 501 and also manages the processing history of the manufactured cans 501 and the like.

The can management system 510 includes a cupping press 521, a bodymaker 522, a washer 523, a code printing device 524 (code applying unit, code applier), the printer 525, a necker 526, an inspection device 527, a management device 550, and the inquiry terminal 560.

The cupping press 521, the bodymaker 522, the washer 523, the code printing device 524 (code applying unit, code applier), the printer 525, the necker 526, and the inspection device 527 are processing devices (processing units) disposed on the production line 520. The production line 520 is a processing system for the cans 501. These processing devices 521 to 527 are disposed in this order from upstream to downstream on the production line 520.

Note that while only some of the processing devices of the production line 520 are illustrated in FIG. 5, the production line 520 actually includes a plurality of other devices (a coating device for coating an inner surface of the can 501, a baking device for fixing the coating, etc.).

The processing devices 521 to 527 are connected to the inquiry terminal 560 and the management device 550 by a communication network 512 such as a LAN in the factory of the cans 501 or a public Internet for communication as necessary.

Note that in the embodiment, a computer refers to an electronic calculator equipped with a storage device, a control device, an arithmetic device, and the like. Each of the devices 521 to 527, 535 to 537, 560, and 570 illustrated in FIG. 5 includes a storage unit and a control unit (figures omitted as appropriate), and is included in the concept of the computer. Each of the devices 521 to 527, 535 to 537, 560, and 570 is not limited to a single electronic calculator and may be constituted of a plurality of electronic calculators as necessary.

The storage unit is a storage device including a hard disk and a semiconductor memory element for storing programs, information, and the like necessary for the operation of each of the devices 521 to 527, 535 to 537, 560, and 570.

The control unit is a device for executing arithmetic processing necessary for the operation of each of the devices 521 to 527, 535 to 537, 560, and 570, and for controlling the individual devices collectively. The control unit includes, for example, a central processing unit (CPU). The control unit implements various functions of the embodiment by reading and executing various programs stored in the storage unit as appropriate.

Devices on Production Line 520

The cupping press 521, the bodymaker 522, and the printer 525 are devices for performing a cupping press step, a bodymaker step, and a printer step, respectively.

The washer 523 is a device that removes oil adhered to the can 501 by washing during processing up to the bodymaker step.

The necker 526 is a device that processes the neck portion of the can 501 or processes the upper end of the can 501 into a flange shape.

The code printing device 524 is a device such as a laser marker. The code printing device 524 applies the individual identification code 506 to the inner surface of the projection portion 505 by laser marking. Note that, in the embodiment, discoloring the can surface by laser marking is also referred to as printing, laser printing, or the like.

The inspection device 527 is a device for inspecting the quality of the can 501 after all processing steps. The inspection device 527 may include a plurality of devices. The inspection device 527 includes, for example, a device such as a defective can tester (DCT) for inspecting the shape of the can 501 and the state of printing.

Here, each of the cupping press 521, the bodymaker 522, the printer 525, and the necker 526 is configured to process a plurality of cans 501 simultaneously or continuously. Thus, the plurality of cans 501 manufactured by using the can management system 510 are processed by different devices (e.g., plates P1 to P5) as the processing device (e.g., printer 525) corresponding to each step.

For example, the cupping press 521 is equipped with eight stamping dies C1 to C8 for producing circular plate members.

Although not illustrated, the eight stamping dies C1 to C8 are arranged in a direction perpendicular to the transport direction of the sheet metal (the plate material from which the cans 501 are made). The cupping press 521 stamps the sheet metal to produce material members, which are eight different circular plate members, with different stamping dies. Each material member is a workpiece and is processed into the can 501 by the processing devices described above.

In the example illustrated in FIGS. 6A and 6B, five plates (blankets) P1 to P5 are provided on the periphery of the blanket wheel 525a of the printer 525. Five cans 501 are held on the mandrels 525c of the mandrel wheel 525b. The can 501 held on the mandrel 525c is then printed on a trunk portion 509 of the can 501 by one of the five plates P1 to P5 of the printer 525.

The bodymakers 522 are disposed in five lanes B1 to B5, respectively. Thus, in the bodymaker step, each of the plurality of cans 501 is formed by one of the bodymakers 522 disposed in these lanes B1 to B5.

Similarly, the neckers 526 are also disposed in five lanes N1 to N5, respectively. Thus, in the necker 526 step, each of the plurality of cans 501 is formed in one of these lanes N1 to N5.

Readers 535 to 537 (Reading Unit)

The printer 525, the necker 526, and the inspection device 527, which are disposed downstream from the code printing device 524, include the readers 535 to 537, respectively. The readers 535 to 537 are, for example, imaging devices, and read the individual identification code 506 applied to the can 501.

After reading the individual identification code 506 applied to the can 501, each of the readers 535 to 537 decodes the individual identification code 506 into an individual identifier and transmits this identifier to the management device 550.

The readers 535 to 537 are configured to transmit the individual identifier of each can 501 and step identifiers of the respective devices (the plates P1 to P5 of the printer 525, the lanes N1 to N5 of the neckers 526, etc.) that processed each can 501, in association with each other, to the management device 550.

For example, a configuration in which the reader 535 of the printer 525 associates the individual identifier of each can 501 with one of the plates P1 to P5 of the printer 525 that printed on each can 501 is as follows.

The reader 535 is fixed at a position where it can image the bottom portions 502 of individual cans 501 held by the mandrels 525c of the mandrel wheel 525b during printing by the plates P1 to P5. An imaging direction of the reader 535 (optical axis direction of the camera of the imaging device) is preferably perpendicular to the inner surface 505a of the projection portion 505 of the can 501 so that the individual identification code 506 provided on the projection portion 505 can be easily read. This allows the reader 535 to obtain the individual identification code 506 applied to the bottom portion 502 of the can 501. In the example in FIGS. 6A and 6B, the timing at which the reader 535 reads the individual identification code 506 is during printing by the printer 525, but is not limited thereto and may be before or after the printing.

On the other hand, the storage unit of the printer 525 stores in advance the ranges of the installation angles of the five plates P1 to P5 with respect to the blanket wheel 525a. The control unit of the printer 525 can determine which of the plates P1 to P5 is used to print on the can 501 by determining the rotation angle of the blanket wheel 525a according to the output of a sensor or the like and referring to the information in the storage unit.

The reader 535 of the printer 525 then obtains information from the control unit of the printer 525 about a plate number (step identifier) of the corresponding plate P1 to P5 that is used to print on the can 501, and then associates this plate number with the individual identifier.

Each necker 526 may be provided with the reader 536 for a total of five readers 536 for imaging the bottom portions 502 of the cans 501 moving on the lanes N1 to N6. In this case, each reader 536 transmits the individual identifier of the can 501 in association with the identifier identifying each reader 536 (i.e., the corresponding lane number (step identifier) of the lanes N1 to N6) to the management device 550.

Note that the processing of transmitting the individual identifier of the can 501 in association with the step identifier to the management device 550 as described above may be executed by a control device such as a PLC. In this case, each control device (e.g., PLC) need only be communicably connected to each reader 535 to 537 and each processing device 525 to 527 and acquire the individual identifiers of the cans 501 and the step identifiers from the individual readers 535 to 537, the individual processing devices 525 to 527, or the like.

Management Device 550

As illustrated in FIG. 5, the management device 550 is a device such as a server capable of collectively managing the can management system 510. The management device 550 is not limited to being a single server or the like and may be constituted of a plurality of servers or the like.

The management device 550 may be located in a facility where the production line 520 is installed or may be located outside the facility. The management device 550 may manage a plurality of production lines 520 by being communicably connected to the plurality of production lines 520 installed in a plurality of facilities, respectively.

The management device 550 includes an operation unit 552, a display unit 553, a storage unit 555, and a control unit 556.

The operation unit 552 is an operation device that allows an administrator or the like of the can management system 510 to operate the management device 550, and includes, for example, a keyboard and a mouse.

The display unit 553 is a display device that displays various types of information and is, for example, a liquid crystal display device.

As shown in FIG. 7A, the storage unit 555 includes the process history table 555a (process history storage section).

The process history table 555a stores information in which the individual identifier of the can 501 transmitted by the processing devices (printer 525, necker 526, etc.) is associated with the step identifiers (the plate number in the printer step, the lane number in the neck step, and the inspection result in the inspection step) and the like as process history.

The control unit 556 executes processing related to analysis of steps that may result in defects in the can 501, processing related to inquiry of the process history, and the like.

Inquiry Terminal 560

The inquiry terminal 560 is a terminal owned by an employee or the like of the manufacturer of the cans 501 (also referred to simply as "employee" in the embodiment). The inquiry terminal 560 may be a general-purpose portable computer (e.g., tablet computer, laptop computer, multifunction portable terminal, etc.). FIG. 7D shows an example in which the inquiry terminal 560 is a tablet computer.

The inquiry terminal 560 is used to inquire about the process history of the can 501 based on the individual identification code 506 of the can 501.

As illustrated in FIG. 5, the inquiry terminal 560 includes a camera 561, a touch panel 564, a storage unit 565, and a control unit 566.

The camera 561 is an imaging device.

The touch panel 564 is a device that serves as both an operation unit and a display unit. The operation unit and the display unit may be independent devices such as a keyboard and a liquid crystal display device.

Operation of Can Management System 510

Processing During Manufacture of Can 501

Processing during manufacture of the can 501 follows the following steps.

As illustrated in FIG. 5, the can 501 goes through the cupping press step by the cupping press 521, the bodymaker step by the bodymaker 522, and the washer step by the washer 523 in this order, and then is transported to the code printing device 524.

Code Printing Step (Individual Identification Code Applying Step)

When the can 501 is transported, the code printing device 524 encodes the individual identifier of the can 501 into the individual identification code 506 (two-dimensional code), and then laser prints the two-dimensional code on the projection portion 505 of the bottom portion 502 of the can 501 (see FIGS. 4A and 4B).

Then, the control unit of the code printing device 524 transmits the code printing time (hour/minute/second), which is the time of laser-printing, in association with the individual identifier to the management device 550. Note that the code printing time may be year/day.

After receiving these pieces of information from the code printing device 524, the management device 550 stores the information in the process history table 555a.

Printer Step

After the code printing step, the can 501 is transported to the printer 525. The printer 525 prints on the outer surface or the like of the trunk portion 509 of the can 501.

When the printer 525 prints on the can 501, the reader 535 of the printer 525 transmits the individual identifier in association with the plate number to the management device 550, as described above.

As shown in FIG. 7A, in response to receiving these pieces of information, the control unit 556 of the management device 550 stores the information in the process history table 555a (individual identifier—step identifier association step).

Necking Step

After the printer step, the can 501 is transported to the necker 526. The necker 526 performs necking on the neck portion of the can 501.

When the necker 526 performs necking on the can 501, the reader 536 of the necker 526 transmits the individual identifier in association with the lane number of the necker 526 to the management device 550, as described above.

As shown in FIG. 7A, in response to receiving these pieces of information, the control unit 556 of the management device 550 stores the information in the process history table 555a (individual identifier—step identifier association step).

Inspection Step

After the necking step is complete, the can 501 is transported to the inspection device 527. The inspection device 527 inspects the can 501.

When the inspection device 527 inspects the can 501, the reader 537 of the inspection device 527 acquires the individual identification code 506 by imaging the bottom portion 502 of the can 501, and then decodes this code into the individual identifier. The reader 537 of the inspection device 527 then transmits the information of the inspection time (i.e., imaging time), the individual identifier, and the inspection result (good or bad) of the individual identification code 506 to the management device 550. Note that the imaging time may be year/month/day.

As shown in FIG. 7A, in response to receiving these pieces of information, the control unit 556 of the management device 550 stores the information in the process history table 555a (individual identifier—step identifier association step).

Note that, after the inspection step, the cans 501 are, for example, loaded onto a pallet and shipped.

Thus, the series of processing steps for the can 501 is complete.

As shown in FIG. 7A, as the manufacture of plurality of cans 501 progresses, the process history table 555a in the management device 550 sequentially stores the history of the processing steps associated with the individual identifiers.

Defect Analysis Processing

Defect analysis processing is processing in which the management device 550 analyzes the information in the process history table 555a. This processing allows a manager or the like of the production line 520 to analyze the processing steps that result in defects in cans 501.

The timing at which the management device 550 executes the defect analysis processing is not limited. For example, the management device 550 may analyze the information in the process history table 555a up to a point in the day in response to any operation timing of the operation unit 552. Alternatively, the management device 550 may be scheduled to execute the defect analysis processing as batch processing after the daily operation of the factory, based on all the information in the process history table 555a for that day.

The control unit 556 of the management device 550 executes the defect analysis processing according to the following steps.

Defective Can Individual Identifier Extraction Processing

With reference to the process history table 555a, the control unit 556 extracts the individual identifiers of the cans 501 that were found to be defective in the inspection.

For example, in the storage range of the process history table 555a shown in FIG. 7A, the individual identifiers C0005 and C0010 of the two cans 501 are extracted.

Step Identifier Extraction Processing

The control unit 556 extracts the step identifiers (plate number and lane number) associated with each individual identifier extracted in the defective can individual identifier extraction processing.

For example, in the storage range of the process history table 555a shown in FIG. 7A, the plate P5 and the lane N5 associated with the individual identifier C0005, and the plate P5 and the lane N3 associated with the individual identifier C0010 are extracted.

Can Quantity Total Processing

The control unit 556 counts the quantity of the individual step identifiers extracted in the step identifier extraction processing, that is, counts the quantity of the cans 501 to obtain the total.

For example, in the storage range of the process history table 555a shown in FIG. 7A, one plate P5 is counted and one lane N5 is counted for the individual identifier C0005. Similarly, one plate P5 is counted and one lane N5 is counted for the individual identifier C0010. The quantity of cans 501 is then totaled for each step identifier.

As shown in FIG. 7B, the control unit 556 creates the histogram H525 with the plate number of the printer step on the horizontal axis and the number of cans 501 on the vertical axis.

As shown in FIG. 7C, similarly, the control unit 556 creates the histogram H526 with the lane number of the necking step on the horizontal axis and the number of cans 501 on the vertical axis.

The control unit 556 displays the histograms H525 and H526 on the display unit 553 of the management device 550.

The manager or the like of the production line 520 can analyze the defective step by checking the histograms H525 and H526 displayed on the display unit 553.

For example, in the necking step histogram H526 in FIG. 7C, there is less difference between the quantity of defective cans in each lane number and the quantities of defective cans in the other lane numbers. That is, the histogram H526 indicates that defective cans of a similar number are manufactured in the five lanes N1 to N5 of the necking step.

Thus, the manager or the like of the production line 520 can analyze that the necking step is unlikely to be the cause of the defect.

On the other hand, in the printer step histogram H525 in FIG. 7B, the quantity of defective cans made using the plate P5 is greater than the quantities of defective cans made using the other plates P1 to P4.

Thus, the manager or the like of the production line 520 can analyze that the plate P5 is likely to be the cause of the defect.

Thus, the management device 550 analyzes the information in the process history table 555a, so that the manager of the production line 520 can analyze the processing step that causes the defect.

History Inquire Processing

The history inquire processing is processing of inquiring about the history of the processing steps of the can 501 based on the individual identification code 506.

The employee of the manufacturer of the cans 501 can perform the history inquire processing by using the inquiry terminal 560 as follows. The timing of performing the history inquire processing is not limited, and may be, for example, during the manufacture of the cans 501, or after the manufacture and before the shipment of the cans 501. Further, the cans 501 subjected to the history inquire processing may be those delivered to a beverage manufacturer, or those distributed to market as beverage products.

The can management system 510 executes the history inquire processing according to the following steps.

Individual Identifier Acquisition Processing

When making a history inquiry about the cans 501, the employee may simply operate the inquiry terminal 560 to image the individual identification code 506 printed on the projection portion 505 of the can 501 with the camera 561.

The control unit 566 of the inquiry terminal 560 acquires the individual identifier by decoding the imaging information of the individual identification code 506.

The control unit 566 of the inquiry terminal 560 transmits this individual identifier to the management device 550 to inquire with the management device 550 about the process history of this can 501.

Process History Inquire Processing

In response to receiving the individual identifier from the inquiry terminal 560, the control unit 556 of the management device 550 extracts the step identifier corresponding to this individual identifier by referring to the process history table 555a.

The control unit 556 of the management device 550 transmits the extracted step identifier to the inquiry terminal 560.

Process History Display Processing

In response to receiving the step identifier from the inquiry terminal 560, the control unit 566 of the inquiry terminal 560 displays the process history display screen 564a on the touch panel 564 as shown in FIG. 7D.

When inquiring with the inquiry terminal 560 about, for example, the process history of the individual identifier C0001, the control unit 566 of the inquiry terminal 560 displays the information of the plate P1 and the lane N1 corresponding to the individual identifier C0001 on the process history display screen 564a.

The employee can confirm the process history by checking the process history display screen 564a.

The process history display screen 564a in FIG. 7D shows an example of displaying information about the manufacturing date, code printing time, inspection result, and inspection time, in addition to the plate number and lane number. In this case, the employee can acquire information of a more detailed process history.

Thus, the can management system 510 can display the process history of the can 501 on the inquiry terminal 560 based on the individual identification code 506 printed on the can 501.

For example, when a plurality of cans 501 unexpectedly have a defective appearance or the like after being sent to market, the employee can confirm the process histories of these cans 501 by imaging the individual identification codes 506 of these cans 501. The employee can analyze the processing step that contributed to the defect based on, for example, the step identifiers common to these cans 501.

Modified Examples of Fifth Embodiment

Note that the disclosure is not limited to the embodiments described above, and various modifications and changes are possible as in the following modified examples. Further, the effects described in the embodiments are merely examples of the most suitable effects arising from the disclosure, and the effects according to the disclosure are not limited to those described in the embodiments. The configurations of the first to fifth embodiments and the modified examples can be used only in part or in combination as appropriate. Detailed descriptions thereof will be omitted.

(1) In the present embodiment, an example is illustrated in which the code printing step is performed between the washer step and the printer step, but the code printing step is not limited to this example. For example, for dry forming sheet metal laminated with a polyester film, for example, the code printing step may be performed between the bodymaker step and the washer step. Alternatively, when a portion to become a projection portion or the like can be predicted in a state where the can bottom portion is formed before the bodymaker step, the code printing step may be performed on a portion to be processed into the bottom portion of a portion to be stamped out as a material member of the can of the sheet metal, or a portion to be processed into the bottom portion of the material member after the cupping press step.

Thus, the code printing step can be performed at an appropriate position on the production line according to the type of can, manufacturing convenience, or the like. Even in this case, in the individual processing steps after the code printing step, providing readers in the processing devices of the individual processing steps makes it possible for the management system to manage the process history in which the individual identifier of the can is associated with the step identifiers of the individual processing steps after the code printing step. For example, when the portion that will become the projection portion can be predicted in the sheet metal state, arranging the code printing step before the cupping press step and providing readers for eight stamping dies (stamping unit) of the cupping press, respectively, makes it possible for the management system to manage the process histories in which the numbers (step identifiers) assigned to the stamping dies of the cupping press are associated with the individual identifiers of the cans.

(2) In the present embodiment, an example is illustrated in which the management device executes the defect analysis processing in response to the operation of the management device, but the defect analysis step is not limited to this example. The management device may execute the defect analysis processing in response to the operation of a terminal (e.g., an inquiry terminal or a company-owned personal computer) that is owned by the employee. In this case, the management device may transmit information of a histogram or the like to the terminal, and the terminal may display the histogram or the like on the display section of the terminal.

(3) In the history inquire processing, when inquire histories of a plurality of individual identifiers are requested from the inquiry terminal, the management device may store these individual identifiers.

Then, based on these individual identifiers, the management device may execute step identifier extraction processing, can quantity total processing, and the like similar to the defective analysis processing. In this case, the management device can analyze the step identifiers corresponding to the plurality of individual identifiers for which the inquire histories were requested. This allows the employee to easily analyze the cause of the defect or the like of the plurality of cans for which the inquire histories were requested.

(4) In the present embodiment, an example is illustrated in which the method of applying the individual identification code to the can is laser printing by laser irradiation, but the method of applying the individual identification code is not limited to this example. The method can be any method that allows individual identification to be applied to the projection portion or the groove portion. For example, the device for applying the individual identification code may be an ink jet printer or the like. If an ink jet printer is used, the ink may be a fluorescent ink that becomes visible when irradiated with ultraviolet rays. In this case, the individual identification code printed on the can is difficult to see when observed under natural light. This results in a satisfactory appearance of the can.

As for the method of applying the individual identification code to the can, as in the first to fourth embodiments, a sticker, a chip, or the like may be applied as appropriate.

(5) In the present embodiment, an example is illustrated in which the processing steps are physical processing, printing, and the like on the can, but the processing steps are not limited to this example. The processing steps may include a can transport step performed by a transport device.

The transport device may be, for example, a mandrel wheel of a printer. In this case, the reader transmits the individual identifier corresponding to the read individual identification code in association with the number (pocket number assigned to the transport pocket) of each mandrel (i.e., the transport pocket that transports the can) of the mandrel wheel to the management device.

What is claimed is:

1. A production line management system for managing a manufacturing line for containers and/or a filling line for containers, the production line management system comprising:
   a first reading unit configured to read an identification code applied to each of the containers when each of the containers with the identification code indicating an identifier being information identifying each of the containers passes through a first point on the manufacturing line and/or the filling line;
   a second reading unit configured to read the identification code applied to each of the containers after the first reading unit reads the identification code; and
   a computing unit configured to
   generate a database in which the identifier indicated by the identification code and relevant information on each of the containers are associated,
   determine normality/abnormality of each of the containers by comparing the relevant information associated in the database with the identifier indicated by the identification code read by the second reading unit with setting information that is predetermined,
   the relevant information includes information for identifying a time of day when the first reading unit reads the identification code, and
   the setting information includes information regarding the time of day that sets a time period during which the containers should be manufactured and/or filled.

2. The production line management system according to claim 1, wherein
   the production line management system is the production line management system for managing a manufacturing line for containers, and
   the production line management system further comprises a code applying unit configured to apply the identification code to each of the containers.

3. The production line management system according to claim 1, wherein
   the second reading unit reads the identification code applied to each of the containers when each of the containers with the identification code passes through a second point downstream from the first point on the manufacturing line and/or the filling line.

4. The production line management system according to claim 1, wherein
   the set time has a predetermined time range, and
   the computing unit determines that the container is abnormal when the first reading time is within the predetermined time range.

5. The production line management system according to claim 1, wherein
   each of the containers is a can having a bottom portion, the bottom portion includes
   a main bottom portion being dome-shaped or flat and constituting a main portion of the bottom portion,
   an annular portion formed in a portion of the bottom portion other than the main bottom portion, having an annular shape when viewed from a direction of a can axis, and having at least one of a convex shape and a concave shape in a cross-section perpendicular to the direction of the can axis, and
   an individual identification code applied to a side portion of the annular portion and corresponding to an individual identifier being information for identifying an individual can.

6. A production line management method for managing a manufacturing line for containers and/or a filling line for containers, the production line management method comprising:
   (a) reading an identification code applied to each of the containers when each of the containers with the identification code indicating an identifier being information identifying each of the containers passes through a first point on the manufacturing line and/or the filling line;
   (b) generating a database in which the identifier indicated by the identification code and relevant information about each of the containers are associated;
   (c) reading the identification code applied to each of the containers after the identification code is read in step (a); and
   (d) determining normality/abnormality of each of the containers by comparing the relevant information associated in the database with the identifier indicated by the identification code read in step (c) with setting information that is predetermined, wherein
   the relevant information includes information for identifying a time of day when a first reading unit reads the identification code, and
   the setting information includes information regarding the time of day that sets a time period during which the containers should be manufactured and/or filled.

7. The production line management method according to claim 6, wherein
   the production line management method is the production line management method for managing a manufacturing line for containers, and the production line management method further comprises applying the identification code to each of the containers.

8. The production line management method according to claim 6, wherein
step (c) is reading the identification code applied to each of the containers when each of the containers with the identification code passes through a second point downstream from the first point on the manufacturing line and/or the filling line.

9. The production line management method according to claim 6, wherein
the set time has a predetermined time range, and
in step (d), each of the containers is determined to be abnormal when the first reading time is within the predetermined time range.

\* \* \* \* \*